US011310420B2

(12) United States Patent
Oberdoerster et al.

(10) Patent No.: US 11,310,420 B2
(45) Date of Patent: Apr. 19, 2022

(54) GENERATING PANORAMIC IMAGES

(71) Applicant: Fraunhofer-Gesellschaft zur Foerderung der angewandten Forschung e.V., Munich (DE)

(72) Inventors: Alexander Oberdoerster, Jena (DE); Andreas Brueckner, Dresden (DE); Jacques Duparré, Jena (DE); Frank Wippermann, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 40 days.

(21) Appl. No.: 16/996,704

(22) Filed: Aug. 18, 2020

(65) Prior Publication Data

US 2020/0382702 A1    Dec. 3, 2020

Related U.S. Application Data

(63) Continuation of application No. PCT/EP2019/054373, filed on Feb. 21, 2019.

(30) Foreign Application Priority Data

Feb. 22, 2018   (DE) ..................... 10 2018 202 707.2

(51) Int. Cl.
*H04N 5/232*     (2006.01)
(52) U.S. Cl.
CPC ..... *H04N 5/23238* (2013.01); *H04N 5/23296* (2013.01)
(58) Field of Classification Search
CPC ................. H04N 5/23238; H04N 5/23296
USPC ........................................... 348/38
See application file for complete search history.

(56) References Cited

U.S. PATENT DOCUMENTS

| 9,838,687 | B1* | 12/2017 | Banta ............... H04N 21/21805 |
| 9,892,488 | B1* | 2/2018 | Brailovskiy ............ G06T 7/337 |
| 2008/0316301 | A1 | 12/2008 | Given | |
| 2014/0003739 | A1* | 1/2014 | S V ....................... H04N 19/13 382/284 |
| 2015/0173846 | A1* | 6/2015 | Schneider ............ A61B 5/0066 600/424 |

(Continued)

FOREIGN PATENT DOCUMENTS

AT           518256 T      8/2011
DE    102015215841 A1     2/2017

(Continued)

OTHER PUBLICATIONS

Houghton, John, "Finding The No-Parallax Point", http://www.johnhpanos.com/epcalib.htm.

(Continued)

*Primary Examiner* — Joseph G Ustaris
*Assistant Examiner* — Matthew David Kim
(74) *Attorney, Agent, or Firm* — Perkins Coie LLP; Michael A. Glenn

(57)  ABSTRACT

What is described are a method and a device, wherein two types of individual images are captured, namely a set of individual images captured simultaneously, and a further set of individual images captured in temporal succession. Among said two sets of individual images, individual images are selected which in combination result in a panoramic image.

14 Claims, 5 Drawing Sheets

(56) References Cited

U.S. PATENT DOCUMENTS

| | | |
|---|---|---|
| 2016/0048973 A1 | 2/2016 | Takenaka |
| 2016/0050370 A1 | 2/2016 | Campbell |
| 2017/0048464 A1 | 2/2017 | Shih et al. |
| 2018/0025472 A1 | 1/2018 | Sun et al. |
| 2018/0176473 A1 | 6/2018 | Wippermann et al. |
| 2018/0198963 A1 | 7/2018 | Wippermann et al. |
| 2019/0114740 A1 | 4/2019 | Ogino et al. |

FOREIGN PATENT DOCUMENTS

| | | |
|---|---|---|
| DE | 102015215844 A1 | 2/2017 |
| EP | 2680586 A2 | 1/2014 |
| JP | 2016040670 A | 3/2016 |
| JP | 2017199982 A | 11/2017 |
| TW | 201707432 A | 2/2017 |
| WO | 2016048013 A1 | 3/2016 |
| WO | 2018024503 A1 | 2/2018 |

OTHER PUBLICATIONS

Littlefield, Rik, "Theory of the "No-Parallax" Point in Panorama Photography", Version 1.0, Feb. 6, 2006; (rj.littlefield@computer.org).

* cited by examiner

GENERATING PANORAMIC IMAGES

CROSS-REFERENCES TO RELATED APPLICATIONS

This application is a continuation of copending International Application No. PCT/EP2019/054373, filed Feb. 21, 2019, which is incorporated herein by reference in its entirety, and additionally claims priority from German Application No. DE 10 2018 202 707.2, filed Feb. 22, 2018, which is incorporated herein by reference in its entirety.

The present invention relates to generating panoramic images, in particular to generating panoramic images having reduced artefacts.

BACKGROUND OF THE INVENTION

In panoramic images, a large viewing angle is covered which does not necessarily include a visual field of 360°. Panoramic images are mostly generated by stitching several images that were captured with different viewing directions.

In one variant of producing a panoramic image, several individual images are generated in succession. Between the individual images, the camera is pivoted a bit. The individual images or partial images are then joined to form a panoramic image by using a so-called stitching technique. The stitching process may be subject to errors. Errors caused by the fact that the entrance pupil does not coincide with the axis of rotation of the camera may be kept to a minimum by design. However, problems which cannot readily be removed are such problems which occur due to movement of objects within the scene that is being captured.

Combining individual images to form one overall image cannot be performed, in accordance with a further variant, on the basis of images captured in time-division multiplex, but may be performed on the basis of such images that are captured in channel-division multiplex. Here, the individual images are captured simultaneously by several channels with different viewing directions and are subsequently joined. Here, parallax problems arise during stitching because the channels are arranged next to one another. Therefore, in both cases there are problems during stitching which are caused by inconsistencies between the partial images, firstly, due to the different times of capturing, and secondly, due to the distance between the optical channels.

SUMMARY

An embodiment may have a device for generating a panoramic image of a panoramic visual field, the device being configured for: simultaneous capturing of a first set of first individual images which together cover the panoramic visual field, by means of several optical channels of a first camera system; capturing at least one second individual image by means of one of the several optical channels of the first camera system, so that the at least one second individual image results, together or together with a first individual image captured by the one of the several optical channels, in a second set of individual images which are captured with mutual time offset and which cover the panoramic visual field; selecting, for at least one image area of the panoramic image, one or more images among a subgroup which consists of the first individual images and of the at least one second individual image and which overlaps with the at least one image area; and rendering the panoramic image while using the one or more images within the at least one image area.

According to another embodiment, a method of generating a panoramic image of a panoramic visual field may have the steps of: simultaneous capturing of a first set of first individual images which together cover the panoramic visual field, by means of several optical channels of a first camera system; capturing at least one second individual image by means of one of the several optical channels of the first camera system, so that the at least one second individual image results, together or together with a first individual image captured by the one of the several optical channels, in a second set of individual images which are captured with mutual time offset and which cover the panoramic visual field; selecting, for at least one image area of the panoramic image, one or more images among a subgroup which consists of the first individual images and of the at least one second individual image and which overlaps with the at least one image area; and rendering the panoramic image while using the one or more images within the at least one image area.

The present application is based on the idea that two types of individual images are captured which lead to a set of simultaneously captured individual images—a first set of individual images—and to a further set of individual images captured in temporal succession—a second set of individual images. To this end, images captured simultaneously—first images—which are generated by means of several optical channels of a camera system and are offset in time in relation to the first individual images and/or to one another—have at least one further individual image—referred to as second individual image(s)—generated by means of one or more of said channels added to them. The set of images captured with mutual time offset may thus be captured from the same "location" and/or with a small basic distance, so that said images exhibit no or only minor parallax. The other set of simultaneously produced images captured does not suffer from movement inconsistencies between the images captured. Due to their complementary advantages, both said sets of individual images may be used for achieving improved stitching to form a panoramic image, i.e. rendering of an improved panoramic image. What may result in combination is a panoramic image which is more free of artefacts than it would be if it had been produced with merely one set of images captured, independently of the type of overall scene, namely a scene comprising or not comprising movement within the overall field of view. Depending on the existing design of the camera system, the additional overhead in terms of design may be very small or non-existent.

In one embodiment, the device determines, within the first overlap area, a first difference between a first pair of first individual images which relate to at least one portion of the panoramic visual field and mutually overlap, within the panoramic field of view, within a first overlap area, and determines, within the second overlap area, a second difference between a second pair of individual images from the second set of individual images, which relate to the same portion of the panoramic field of view and mutually overlap, within the panoramic field of view, within a second overlap area; the first pair is selected for constructing the panoramic image if the first difference is smaller than the second difference, and the second pair is selected for constructing the panoramic image within the portion if the first difference is larger than the second difference. The first and second overlap areas may be congruent.

In a further embodiment, the device is established to perform determining of the first and second differences and selecting, on the basis thereof, of the first or second pair along a second direction which is perpendicular to the first direction along which the fields of view covered by the pairs of individual images are located next to one another, in such a manner that said determining is subdivided into cross-sections/stripes, so that the selections for different cross-sections that are transverse to the second direction may differ.

In one embodiment, capturing of the at least one second individual image is performed such that the individual images of the second set of individual images are captured with different viewing directions, and so that between the individual images of the second set of individual images, a variation in the viewing direction is performed which is caused by rotating an optical channel of the entire camera system, or by rotating the entire camera system, and/or by switching a switchable optical element, which causes deflection of an optical path of the one optical channel or of an optical path of each of the several channels of the camera system, and/or by rotating a mirror or prism for deflecting an optical path of the one or more optical channels or of an optical path of each of the several channels of the camera system.

In a further embodiment, the system includes a second camera system and is configured for simultaneously capturing a third set of individual images, which together cover the panoramic visual field, by means of several optical channels of the second camera system, the second camera system being arranged in an offset manner in relation to the first camera system, for capturing at least a fourth individual image, by means of one of the several optical channels of the second camera system, so that the at least one fourth individual image results/result, together (i.e. by itself or by themselves) or together with a third individual image captured by the one of the several optical channels, in a fourth set of individual images which have been captured in a mutually time-offset manner and also cover the panoramic visual field, and for rendering a further panoramic image or a depth map for the panoramic image on the basis of the third set of third individual images and of the at least one fourth individual image.

BRIEF DESCRIPTION OF THE DRAWINGS

Embodiments of the present invention will be detailed subsequently referring to the appended drawings, in which.

DETAILED DESCRIPTION OF THE INVENTION

Before embodiments will be described by means of the figures, it shall once again be briefly illustrated and explained how the embodiments described below result in advantages.

As was mentioned in the introduction to the description, it may be reasonable, for various reasons, to stitch several images having comparatively small fields of view to form one image having a larger field of view. For example, the overall resolution of the image may be higher, or the dimensions of the camera system are lower, or the form factor of the system may be more favorable, or the camera system may be designed in a particularly flat manner.

Essentially, two methods are available for capturing the individual images:
1. Time-offset capturing of the individual images by means of one single optical channel. To this end, the viewing direction is changed between the images captured, e.g. by rotating the overall camera or by deflecting the optical path by means of a movable mirror. All images are captured from one shared location.
2. Simultaneous capturing of the individual images by means of several optical channels comprising different fixed viewing directions. In this case, the optical channels are inevitably not located at the same position but are laterally offset from one another. A beam splitter would enable several optical channels to have a shared nodal point, but may result in undesired light loss.

In the first method, the individual images differ in terms of the points in time when they are captured, in the second method, they differ in terms of the camera locations. This may result in complications during stitching of the individual images to form the panoramic image. Artefact-free stitching is possible only for scenes having the following properties:
1. Static scenes, i.e. there is no movement of objects within the scene between the instants of image-taking.
2. All objects of the scene are at the same distance from the camera system or are at a distance that is large as compared to the offset of the optical channels, by a factor of 100 or more, depending on the angular resolution of the camera system.

Rendering of other scenes may also be tried but involves increased algorithmic expenditure. If the reconstruction fails, this will result in ghost images or non-matching edges and image details.

Artefacts may be reduced, for example, by quickly switching the viewing direction or by using a small distance of the optical channels.

The embodiments described below benefit from the individual advantages and/or scene-specific suitabilities of both variants by capturing two sets of individual images—one that is captured simultaneously and one that is captured in a time-offset manner, so that the construction of the panoramic image may be improved, overall, on the basis of the two sets, irrespectively of the type of scene, i.e. whether it comprises movement and/or intense depth variations in the individual-frame overlap areas.

Figure 1:
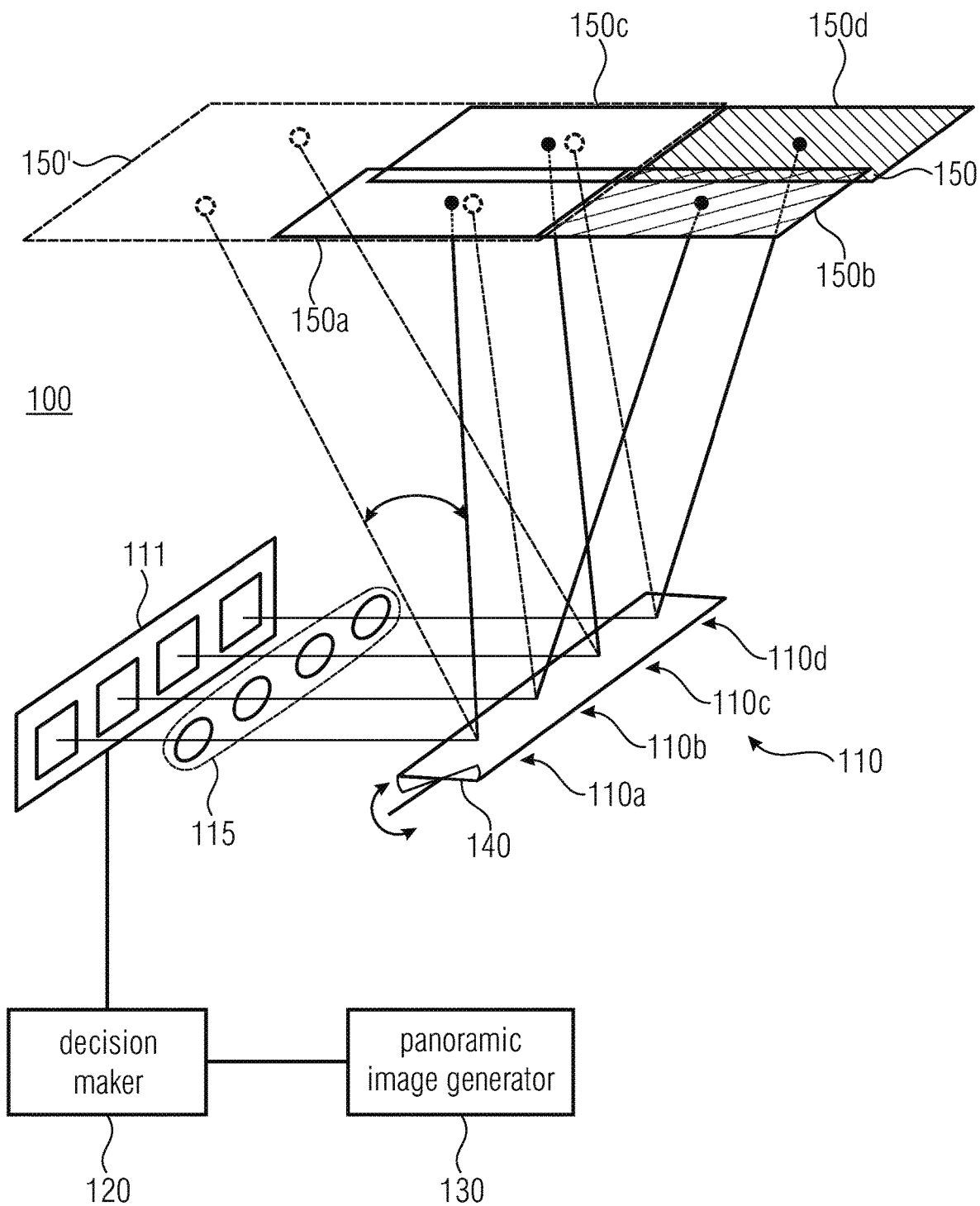
FIG. 1 is a schematic representation of a device for generating panoramic images in accordance with an embodiment.

FIG. 1 shows a schematic representation of an embodiment of a device 100 for generating a panoramic image. The device 100 includes an arrangement of several optical channels 110a-110d of a camera system 110. In the present example, the camera system includes four optical channels; however, the present invention is not limited to four optical channels but may comprise two or more channels. The camera system 110 may include, per channel 110a-110c, one or more lenses or one or more other optical elements 115 which serve to image, or project, a respective subarea or partial field of view 150a-150d, associated with the respective channel, from an overall panoramic visual field 150 to a respective image sensor or a respective image sensor portion of an image sensor 111. The channels may extend, in a manner in which they are essentially in parallel with one another, from the image sensor 111 to a deflection means such as a mirror, for example, which deflects the optical paths of the channels and/or their visual fields. It is pivotable between a first position shown in FIG. 1, wherein the total field of view is 150, and a second position wherein the total field of view is 150', which is offset in relation to 150 in the first position such that the partial fields of view 150$d$, 150$b$ of the channels 110$d,b$ in the second position 150' will substantially overlap with the partial fields of view 150$c,a$ of channels 110$c,a$ in the first position. To this end, the partial fields of view 150$a$-$d$ in each position are arranged here, by way of example, to mutually overlap in a 2×2 array so as to cover the total field of view, so that the total fields of view 150, 150' in both positions are offset from each other by a partial field of view in a direction parallel to the optical paths upstream from the deflection means 140 and perpendicular to the pivot axis of the deflection means 140. Thus, the channels 110$d$, 110$b$ are capable of covering the entire field of view from the first position 150 when one looks at the sequence of positions 150 and 150'. Subdivision into a 2×2 coverage and the number of partial fields of view are non-critical, and the number of positions might also be increased. The positions will play a part in capturing a panoramic image, as will be described below.

The camera system 110, and/or its image sensor(s) 111, is/are connected to a decision device 120 selecting, from a group of individual images which have been captured in accordance with a specific approach to be described in more detail below, a set of individual images which are then to be stitched to form a panoramic image; the selection of the set of images may also vary, e.g. in a direction transverse to the mutual offset in the partial fields of view, as will be described below. Stitching/rendering the panoramic image by selecting images captured is performed by the panoramic image generator 130. In addition, the device may include, in some embodiments, means 140 which changes the "viewing direction" of the camera system. As was described, for producing a panoramic image, the total field of view of the panoramic-image camera may be pivoted (panned). Said pivoting, which might also be performed manually by the user, may of course also be performed, in some embodiments, by a means which changes the orientation of the camera system, or the orientation of its total field of view, during the course of a panoramic capturing operation. As an alternative to FIG. 1, this might also be performed, for example, by rotating the entire camera system 110, but is accomplished here by rotating the deflection means such as a mirror or prism, for example, so that the optical path of each of the optical channels of the camera system is deflected, as is indicated here by the double arrow at the deflection means 140 in FIG. 1. Alternatively, it would also be possible to change the viewing direction and/or the position by switching a switchable optical element, said optical element effecting a deflection of the optical path. As was mentioned above, varying the viewing direction of the camera system might also still be performed manually by the user of the camera.

It shall be emphasized that the presence of a deflection means 140 may have a purpose which results already from a requirement different than that of changing positions, as will be used here in the following for the purposes of producing a panoramic image, e.g. for image stabilization purposes, so that in such a case, a camera system which already exists may be expanded without taking any major design-related measures so as to generate panoramic images in accordance with the present application. In the event of making double use of the deflection means 140 for image stabilization in the direction transverse to the pivot axis, there is also an advantage in the fact that in this case, the change in the viewing direction may be performed within a very short time period, i.e. the deflection means may perform the positional changes very fast, so that there is only a small time difference between the images captured in the different directions and/or positions 150, 150'.

Figure 2:
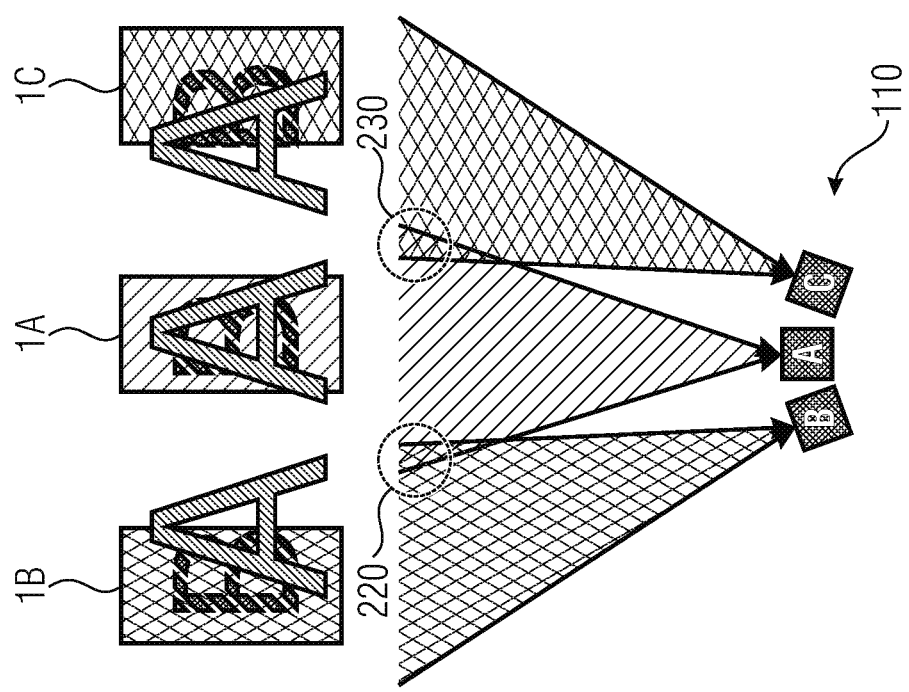
FIG. 2 shows a schematic representation of a camera system in accordance with an embodiment.
Figure 2:
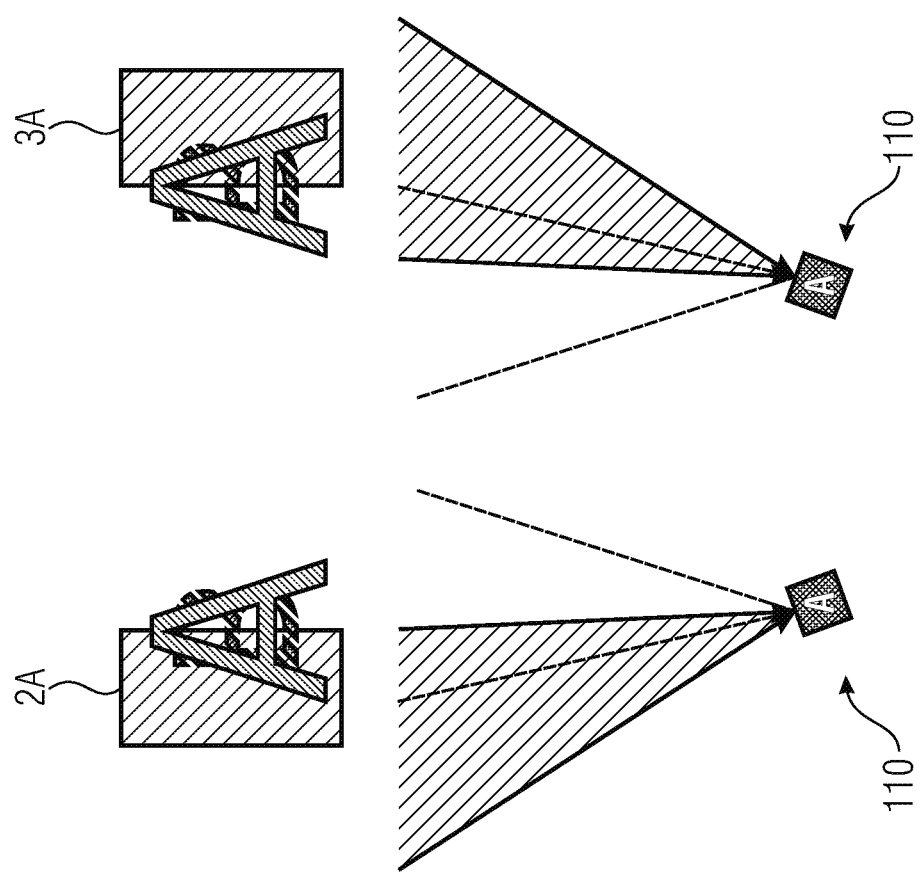

FIG. 2 shows a schematic representation that is to illustrate how different sets of individual images might be captured in one embodiment. For illustration purposes, FIG. 2 increases the number of positions and also the number of channels in the direction of the relative offset of the total field of view between the positions from two, as depicted in FIG. 1, to three; however, sub-division into two neighboring partial fields of view, said sub-division being transverse to the direction of the offset in the total field of view between the positions in FIG. 2, is immaterial. The sequence of images captured as will now be described might be passed through by the camera system 110 automatically, e.g. controlled by a controller of the system 110, e.g. upon actuation of a capturing button on the part of the user, possibly in a specific panoramic capturing mode.

Thus, in this example of FIG. 2, the camera system 110 shown comprises three optical channels A, B and C, but a different number of optical channels is also feasible. The optical channels may belong to one single camera, i.e. the channels may be firmly installed within a housing, as is illustrated in FIG. 1, or there may also be three adjacently arranged individual cameras, at least one of which, namely here at least the one forming channel A, is pivotable so as to be directed to the partial fields of view of the other two channels A and C. As may be gathered from the figure, the three channels A, B and C are adjacently arranged, so that they may simultaneously capture individual images in the direction of a panoramic visual field, the respective viewing directions of the individual optical channels slightly deviating from one another, so that the respectively captured individual images comprise overlap areas 220, 230. This occurs, e.g., during capturing in a position 1, which results in images 1A, 1B and 1C which cover the total field of view with mutual overlaps between 1A and 1B and between 1B and 1C.

In a position 2, channel A may be aligned to be directed to the viewing direction of channel B in position 1, for example by pivoting to the left. In an idealized way, it is assumed in FIG. 2 that pivoting of channel A between the positions takes place such that its nodal point remains constant, but this is only an example, and pivoting in accordance with FIG. 1, or any other beam deflection as was described there, would also be possible and changes only little in terms of the concept and spirit of the following description of panoramic-image generation. In position 2, channel A may generate a image 2A which essentially covers the same partial field of view as does image 1B by means of channel B in position 1. In addition, a position 3 is also illustrated wherein the field of view of channel A is brought in the direction of the field of view of channel C in position 1 so as to generate a image 3A of said field of view.

To illustrate the advantages and mode of operation of subsequent processing of the images 1A-1C, 2A and 3B to form a total field of view, FIG. 2 illustrates letters A and B as examples of objects in the scene. They are located at different distances within the scene, which is illustrated by their different sizes. By means of the objects, the influence of different times of capturing between positions 1, 2 and 3 as well as the influence of the scene depth, i.e. of the different depths and/or object distances of objects within the scene, are to be explained, as well as the manner in which one prevents or minimizes the extent to which this influence may have a negative impact on a panoramic image generated from images 1A-1C, 2A and 3A. To this end, the letter B is arranged at a different, larger distance from the camera system 110 than is the letter A.

In addition, FIG. 2 shows encircled areas 220 and 230, wherein the capturing areas of cameras A and B, or A and C overlap in position 1. This means, e.g. in the case of the overlap 220, that the individual image 1A comprises an overlap with the individual image 1B. More specifically, individual image 1A exhibits, in its left-hand area, an overlap with the right-hand area of individual image 1B. This means that within said area, the same image contents are comprised. Said image contents, however, may differ from one another due to parallax effects, so that the image contents may not be identical. By analogy, there is the overlap area 230 between the individual images 1A and 1C as well as overlap areas (not explicitly shown) between the individual-frame pairs 1A+2A and 1A+3A due to the co-alignment of 1B and 1A, and 3A and 1C, respectively. The meaning of the overlap areas will be addressed in more detail below with reference to FIG. 4.

In the example of FIG. 2, channel A of the camera system 110 thus captures image 1A while image 1B is simultaneously captured by channel B, and image 1C is simultaneously captured by camera C. This occurs at position 1. Since the cameras and/or the optical channels A, B and C are not located at the same position but are arranged to be slightly offset in relation to one another, the images captured may exhibit a parallax. This is indicated by the different positions of the above-mentioned letters A and B, which are located within the panoramic visual field.

In the individual image 1A, the letter B seems to be located centrally behind the letter A. The optical channel B, which captures the partial field of view located, in the viewing direction, to the left of channel A, and which generates the individual image 1B, by contrast, sees the letter B to be laterally offset towards the left in relation to the letter A since its nodal point, or its entrance pupil, is located laterally to the left of that of channel A. It looks at the scene slightly from the left-hand side. By analogy, the optical channel C captures the individual image 1C wherein the letter B seems to be offset slightly to the right in relation to the letter A. This effect, the parallax effect, occurs when the optical channels are laterally offset from one another and when the scene exhibits a depth, i.e. when the objects therein are arranged at different distances.

It shall be noted that the order of passing through positions 1, 2 and 3 is not relevant and might also be changed; however, what will now be looked at next are position 2, wherein the optical path A is rotated towards the left so as to capture the individual image 2A, and position 3, wherein the optical channel A is rotated toward the right so as to capture the individual image 3A. With regard to the partial field of view of the image captured, they correspond to individual images 1B and 1C, respectively, but unlike the individual images 1B and 1C, the images 2A and 3A are captured from a same perspective as is at hand for the individual image 1B. Accordingly, it can be seen in FIG. 2 that no parallax effect occurs here since the location of the optical channel A does not change, i.e. in images 2A and 3A, the letter B overlaps with the letter A in the same manner as in image 1A. Therefore, in this case there is no parallax.

In general, it would therefore be advantageous to generate a panoramic image on the basis of the set of images 1A, 2A and 3A, since there, the arrangement of the letters A and B relative to each other does not differ and since, therefore, no artefacts arise.

However, it is also clear that the set of images 1A, 1B and 1C is captured at the same time, whereas the images 1A, 2A and 3A form a set of images that need to be generated with a mutual temporal offset since in between the individual images captured, the camera and/or the optical channel A may be pivoted to the left or to the right, or some other manipulation/switching of the viewing direction may take place.

If, in the example of FIG. 2, the arrangement of letters A and B within the panoramic visual field is static, it would not be necessary, for example, to resort to the images, or individual images, 2A and 3A which were shot at the same time, but it would be more advantageous, in order to generate an artefact-free panoramic image, to use the set of individual images 1A, 1B and 1C which were shot in temporal succession. However, if the objects within the panoramic visual field are not static but exhibit a movement, or if what the scene is dynamic, the situation may be different, as shown in FIG. 3.

Figure 3:
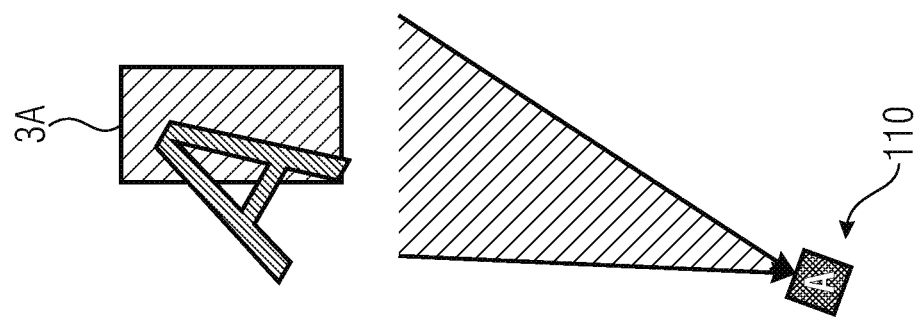
FIG. 3 shows a schematic representation of a camera system in accordance with an embodiment, wherein the object to be photographed is moving.
Figure 3:
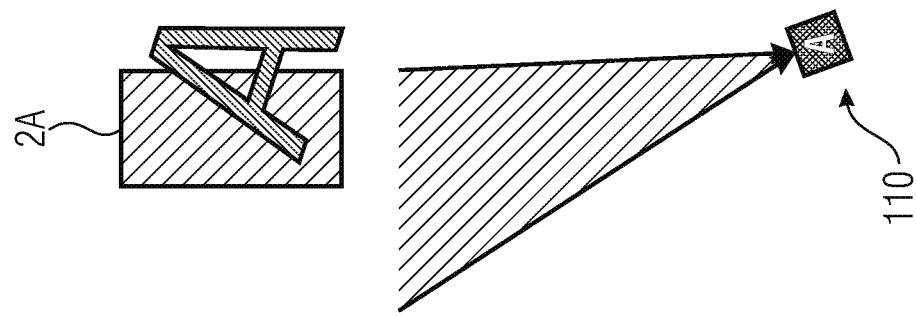
Figure 3:
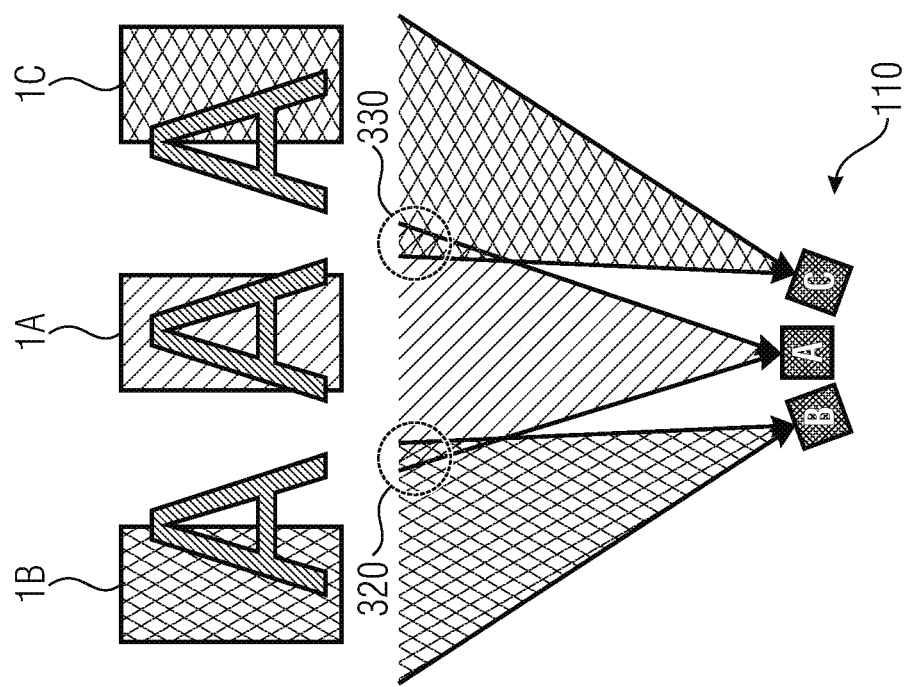

FIG. 3 schematically shows a similar arrangement to that shown in FIG. 2, but in this case, the letter A has a movement to it. In the specific example, this letter performs a clockwise rotation.

The three individual images 1A, 1B and 1C which were captured at the same time each show the letter A with the same orientation since the images were captured at the same time, after all. The individual images 2A and 3A which were shot afterwards in a time-offset manner by the optical channel A after the optical channel A had been pivoted to the left and to the right show the letter A in a somewhat rotated position. Thus, the individual image 2A shows that the letter A is rotated slightly to the right, in relation to the orientation of the letter A in the images 1A, 1B and 1C, since the individual image 2A was shot after the individual images 1A, 1B and 1C. Since the individual image 3A was shot even prior to capturing of the individual image 2A, the letter A within the individual image 3A is shown to be rotated some more in the clockwise sense. FIG. 3 serves to elucidate the effect that moving objects may present themselves to the observer in different positions in individual images which were shot in temporal succession, and it shall once again be emphasized that the order of passing through positions 1, 2 and 3 might also be changed.

If the panoramic image now were to be generated from the set of individual images 1A, 2A and 3A, there would be a clear-cut optical artefact due to the successive rotating of the letter A. In this case, it would be more advantageous to produce the panoramic image on the basis of the set of individual images 1A, 1B or 1C.

Depending on the scene, it may occur that different scene situations occur at the overlap areas 220 and 230, i.e. movement and/or scene depth, so that a different set of individual images might possibly be the most advantageous one for panoramic image generation, such as generation on the basis of the set of individual images 1A, 2A or 3A, or the set of individual images 1A, 2A and 1C.

In order to decide which combination of individual images is more advantageous for generating the panoramic image, it is possible, in exemplary embodiments, to look at the above-mentioned overlap areas 220, 230 of the individual images in more detail, and/or to examine pairs of individual images which overlap within said overlap areas.

As shown in FIGS. 2 and 3, the individual image 1A exhibits, on the left-hand side shown here, an overlap with the individual image 1B. The same also applies to the pair consisting of frame 1A and individual image 2A. By analogy, the individual image 1A has an overlap area with the individual images 1C and 3A in the right-hand area of frame 1A.

Figure 4:
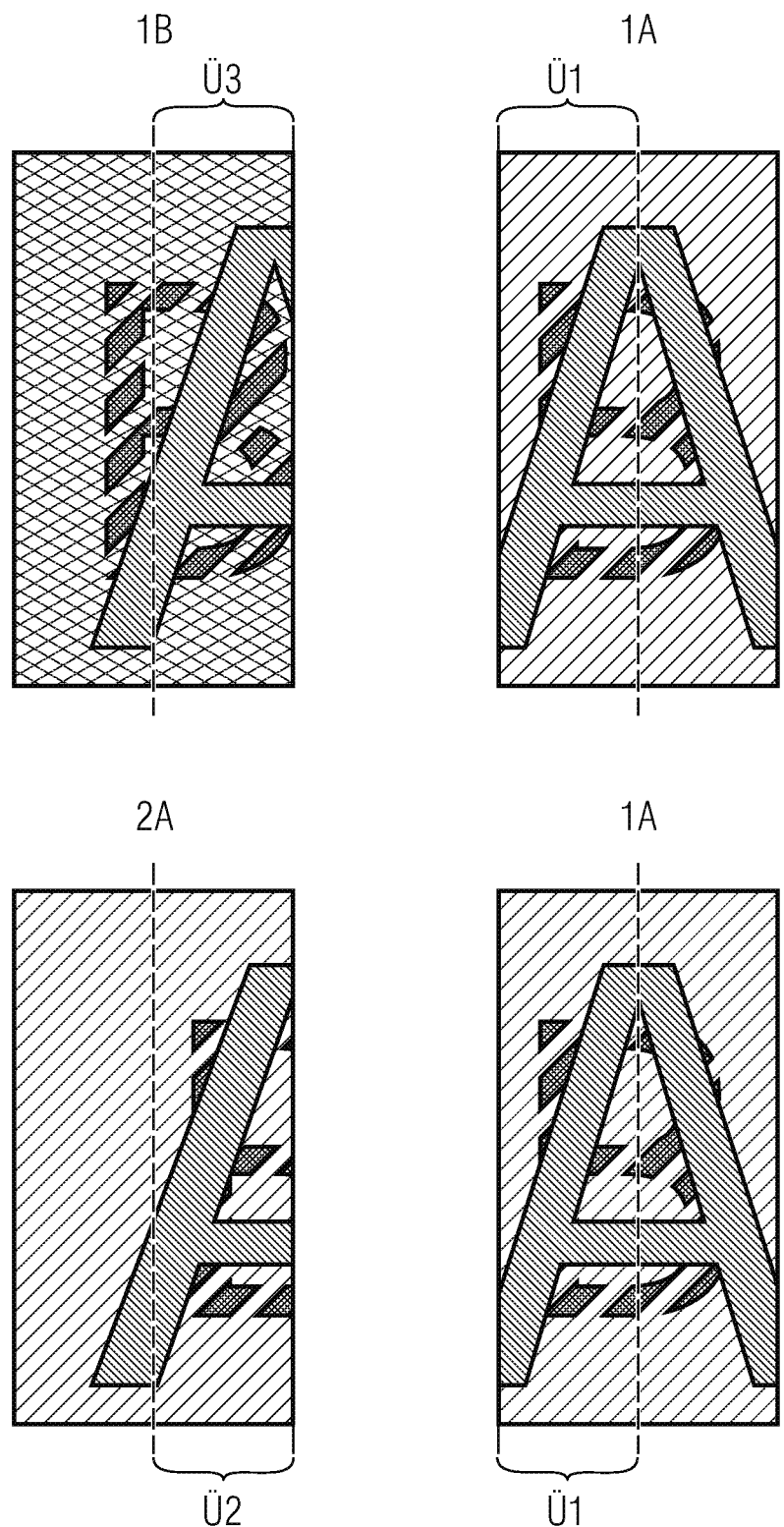
FIG. 4 shows a schematic representation of mutually overlapping pairs of individual images relating to a shared overlap area for analyzing same with regard to the pair that is advantageous for generating the panoramic image.

FIG. 4 shows a schematic representation which is to explain in more detail the concept of deciding on the composition of the set of images captured as the basis or the panoramic image generation by means of an analysis of the overlap areas as is performed by the decision maker 120. What is shown are individual images 1A, 1B and 2A of FIG. 2; in the left-hand area of FIG. 4, the individual images 1A and 1B are depicted to be adjacent, and in the right-hand area, individual images 1A and 2A are shown.

In FIG. 4, the overlap areas O1 and O2 are marked for the individual images. Those are the areas which in the individual images 1A and 2A relate to the same part of the panoramic visual field. It is obvious that the overlap area O1 carries the same image information as the overlap area O2. This is not surprising since the panoramic image area of FIG. 2 exhibits no movement and since, therefore, the individual images 1A and 2A, which were shot in a temporally offset manner, are highly similar in the overlap area, since in this case, the parallax effect does not arise because they were shot from the same perspective, i.e. the position of the channel was the same in each case. The individual image 1A and 1B are also compared in FIG. 4. Among said individual images, the overlap areas O1 and O3 are marked. Here, the similarity in the overlap area is not as pronounced as in the situation of the pair of frames 1A and 2A. The individual-image information about the left-hand half of letter A is indeed very similar in both overlap areas, but due to the parallax effect, one sees more of the left half of the letter B in frame 1A, whereas the letter B can hardly be seen at all in the overlap area O3.

When comparing the similarity of the overlap areas O1 and O2 as compared to areas O1 and O3, the pair of individual images 1A and 2A exhibits more similarity. For generating a panoramic image, the pair of individual images 1A and 2A would be the combination that is advantageous.

Generally, in an example, in order to decide whether the combination of individual image 1A with 1B or the combination of individual image 1A with individual image 2B is more advantageous for the overall panoramic image, a difference in the overlap area between frame 1A and frame 1B may be determined, and likewise, a difference between individual image 1A and individual image 2A within the overlap area may be determined. Depending on which of the two differences is smaller, a combination of two individual images will be selected for generating the panoramic image.

In order to form difference, or a differential value, within the overlap area of two individual images it is feasible, for example, to compare the individual images pixel by pixel within the overlap area and to sum up the amounts of the differential values. Other methods might also be used, e.g. summing up of squared differential values that are to be determined pixel by pixel, or evaluating a correlation maximum with mutual displacement of the pairs of individual images along the direction in which the fields of view are located next to one another.

Figure 5:
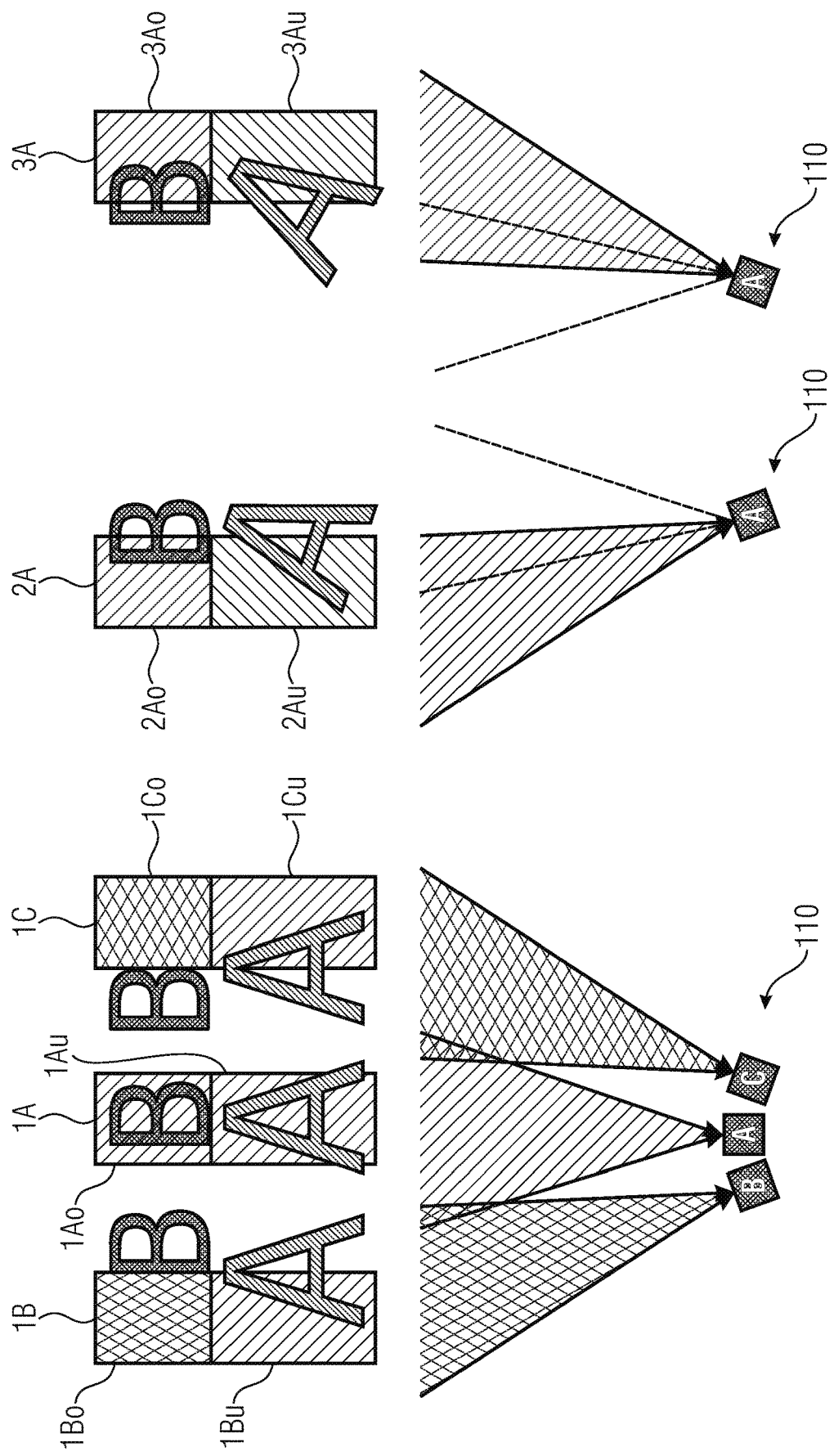
FIG. 5 shows a schematic representation of mutually overlapping pairs of individual images relating to a shared overlap area for analyzing same with regard to the pair that is advantageous for generating the panoramic image, the analysis being refined portion by portion.

FIG. 5 schematically shows a further embodiment wherein the individual images are subdivided into segments or cross-sections for which separate decisions are made as to what will be used for generating the panoramic image are those portions/cross-sections which are shot at the same time accordingly or those cross-sections which are shot in temporal succession but exhibit no parallax.

The panoramic visual field of this example is characterized in that the letter A has movement to it, i.e. it exhibits a temporal change due to clockwise rotation, whereas the letter B is static. In this case, the letter B is arranged above the letter A, as a result of which the panoramic image area may be subdivided into an upper area without movement and a lower area exhibiting movement.

Therefore, in FIG. 5, each individual image is subdivided into an upper area and a lower area, e.g. the individual image 1A is subdivided into the lower area 1Au and the upper area 1Ao; the same applies by analogy to the other individual images 1B, 1C, 2A, and 3A.

In selecting the upper or lower half images for utilizing them for rendering the panoramic image, the upper area will firstly be addressed. Because of the lack of movement in the upper area, an analysis applies which essentially corresponds to that of FIG. 2. On the basis of the upper image area 1Ao, the individual-frame cross-sections 2Ao and 3Ao are advantageous as compared to portions 1Bo and 1Co since the individual-frame cross-sections 2Ao and 3Ao comprise no parallax, and since it is therefore to be expected that they will result in a more consistent panoramic image.

In the lower areas of the individual images it is more advantageous, in the present case, to generate the panoramic image on the basis of the individual-frame cross-sections 1Au, 1Bu and 1Cu since the individual-frame cross-sections 2Au and 3Au comprise a rotated letter A. Since in human perception, a rotation may frequently be felt to be more disturbing than a parallax effect, and since the similarities in the overlap areas are less due to the rotation, the individual-frame cross-sections comprising parallaxes are that is advantageously used for rendering the panoramic image in the present case.

In a non-depicted case wherein the rotation of the letter A is clearly slower, i.e. the individual image 2Au would show a letter A that is only slightly rotated, it would be feasible that in this case, the individual-frame cross-section 2Au exhibits a higher degree of similarity with the corresponding overlap area of the individual-frame cross-section 1Au, and that in this case, the combination of 1Au and 2Au would be more advantageous as compared to the parallactic combination of 1Au and 1Bu; however, it would then also be possible that in the individual image 3A, rotation of the letter A can already be perceived more clearly and that in this case, the combination of 1Au and 1Cu is advantageous as compared to the combination of 1Au and 3Au.

In general, it can be stated that assessment of static scenes, of scenes comprising objects at a relatively large distance, and of scenes comprising objects at a limited range of distances is relatively unproblematic.

Following on from the concept of subdividing the individual images into individual-frame cross-sections as shown in FIG. 5, it is also feasible that the individual images themselves may be decomposed into further cross-sections, e.g. into three, four or even more cross-sectional areas. This may be useful in cases wherein an individual image subdivides itself, in a direction perpendicular to the pivoting direction of the panoramic image, into areas which are either static or exhibit movement.

To assess whether or not further subdivision into refined cross-sections is useful, such subdivision may be made on a trial basis, and the degree of similarity of the different cross-sections may be calculated. In the event that the respective differences in cross-sections turn out to be non-significant, further refined subdivision into cross-sections may be dispensed with; in the event that clear differences are revealed, one may conclude that finer subdivision into cross-sections is useful and may proceed accordingly. Such an approach works for a relatively large number of scenes and is problematic only for image details which contain both movement and an offset in depth. Said offset in depth results in the above-discussed parallax effects.

In literature, arrangements are described which are to measure and equalize parallax effects. What is at hand there are simultaneous shots of individual images by means of several optical channels having different static viewing directions. However, each of said channels exists also as a duplicate, the basic width being deliberately selected to be as large as possible. In this manner, each partial field of view is shot from two locations. Said double shooting of the scene by using two cameras with a certain basic width/basic distance enables producing disparity between those two views, and because of said disparity, the parallax may be compensated for for the entire field of view so as to eventually obtain an overall image free from artefacts.

However, there are scenes wherein gaps arise, due to concealment effects, either as early as during depth estimation or during compensation. There will then be image parts for which either no depth estimation is possible or for which parallax compensation exposes areas of scenes which were not captured by any of the optical channels. In this case, parallax compensation is not possible without errors. Even if the scene is static, no panorama that is free from artefacts or from error can be generated. However, if additionally at least one channel is rotated or deflected such that said channel will detect all of the areas of the field of view, a panoramic image may be generated with static scenes without any parallax compensation. This is useful in the above-described case of concealment but may also occur without any concealment so as to avoid complex parallax compensation. A device for capturing the individual images may contain a mirror or a different means for deflecting the viewing direction. In this case, using the previously described method is particularly advantageous since the mechanical requirements are already met. Changes are made only when controlling the mirror or during image evaluation.

In addition, provision may be made, in embodiments, for capturing all of the image areas by means of not only one channel as in the previously mentioned examples with channel A, but also by means of the remaining optical channels B and C. If the viewing directions of the other optical channels are changed at the same time as that of the first channel, the capturing time will not be prolonged as a result.

Fast switching of the viewing direction, e.g. to capture the individual images 2A and 3A, may be achieved by rotating the overall system or at least the camera system by means of a switchable optical element, e.g. by means of a tunable lens or a liquid crystal lens or a liquid lens, or by rotating and/or tilting of a mirror or prism within the optical path. Such a mirror or prism might be driven by means of a piezo control or an electric motor.

In particular by using switchable optical elements or by rotating or tilting a mirror or prism, switching times within the range of several 10 milliseconds may be achieved, which is comparable to common exposure times with poor illumination.

In all cases care is to be taken to ensure that by the rotation or tilting, no parallax is introduced, or that any parallax introduced is at least minimized. It may suffice to achieve that the displacement caused by parallax is smaller than the accuracy degradation in depth.

If the camera system used is equipped with autofocus, all shots can and should be performed while using a setting determined during the first shot. This reduces the time elapsing between the shots to that amount of time that may be used for switching the viewing direction. Identical setting of focus for all partial images is also favorable for compiling the panoramic image.

Such an inventive camera system may be employed in mobile phones and vehicle camera, and may also find application in robotics, video conference systems, remote sensing, medical applications and machine vision. Likewise, the inventive method is suitable for multichannel camera systems wherein a mirror or other mechanism for controlling the viewing direction already exists. This is the case, e.g., in systems comprising folded optical paths.

Even though some aspects have been described within the context of a device, it is understood that said aspects also represent a description of the corresponding method, so that an element of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example. Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, digital storage medium or computer-readable medium are typically concrete and/or non-volatile, or non-transitory.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

The devices described herein may be implemented, for example, while using a hardware device or while using a computer or while using a combination of a hardware device and a computer.

The devices described herein, or any components of the devices described herein, may be implemented at least partly in hardware and/or in software (computer program).

The methods described herein may be implemented, for example, while using a hardware device or while using a computer or while using a combination of a hardware device and a computer.

The methods described herein, or any components of the methods described herein, may be implemented at least partly in hardware and/or in software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a panoramic image of a panoramic visual field, the device being configured for:
    simultaneous capturing of a first set of first individual images which together cover the panoramic visual field, by means of several optical channels of a first camera system;
    capturing at least one second individual image by means of one of the several optical channels of the first camera system, so that the at least one second individual image results, together or together with a first individual image captured by the one of the several optical channels, in a second set of individual images which are captured with mutual time offset and which cover the panoramic visual field;
    selecting, for at least one image area of the panoramic image, one or more images among a subgroup which is comprised of the first individual images and of the at least one second individual image and which overlaps with the at least one image area;
    rendering the panoramic image while using the one or more images within the at least one image area
    determining, within a first overlap area, a first difference between a first pair of first individual images which relate to at least one portion of the panoramic visual field and which overlap each other, within the panoramic visual field, within the first overlap area,
    determining, within a second overlap area, a second difference between a second pair of individual images from the second set of individual images which relate to the portion of the panoramic visual field and which overlap each other, within the panoramic visual field, within the second overlap area,
    selecting the first pair for rendering the panoramic image within the portion if the first difference is smaller than the second difference, and
    selecting the second pair for rendering the panoramic image within the portion if the first difference is larger than the second difference.

2. The device as claimed in claim 1,
wherein the subgroup comprises at least one individual image from the first set and at least the at least one second individual image.

3. The device as claimed in claim 1,
wherein the first individual images are located next to one another along a first direction within the panoramic visual field, the device being configured to perform determining of the first and second differences and selecting, on the basis thereof, of the first or second pair along a second direction, which is perpendicular to the first direction, in such a manner that said determining is subdivided into cross-sections, so that the selections for different cross-sections that are transverse to the second direction may differ.

4. The device as claimed in claim 3,
configured to adaptively refine the subdivision into cross-sections.

5. The device as claimed in claim 1,
wherein the first individual images are located next to one another along a first direction within the panoramic visual field,
the device being configured to select a first group of one or more predetermined images for a first partial image area and to select a second group of one or more predetermined images, which differs from the first subgroup, for a second partial image area which overlaps with the first partial image area along the first direction but is offset from the first partial image area in a second direction perpendicular to the first direction.

6. The device as claimed in claim 1,
wherein the first individual images are located next to one another along a first direction within the panoramic visual field,
the device being configured to perform the selection along a second direction, which is perpendicular to the first direction, in a manner that is subdivided into cross-sections, so that the selections for different cross-sections may differ.

7. The device as claimed in claim 1,
wherein capturing of the at least one second individual image is performed such that the second set of individual images is captured with a smaller parallax as compared to the first set of first individual images.

8. The device as claimed in claim 1,
wherein capturing of the at least one second individual image is performed such that the individual images of the second set of individual images are captured with different viewing directions, and the device being configured to perform, between the individual images of the second set of individual images, a variation in the viewing direction by:

rotating the one optical channel or the camera system, and/or switching a switchable optical element, which causes deflection of an optical path of the one optical channel or of an optical path of the several channels of the camera system; and/or rotating a mirror or prism for deflecting an optical path of the one or more optical channels or an optical path of the several channels of the camera system.

9. The device as claimed in claim 1, comprising a second camera system and further configured for simultaneous capturing of a third set of third individual images which together cover the panoramic visual field, by means of several optical channels of the second camera system, the second camera system being arranged offset in relation to the first camera system;

capturing at least one fourth individual image by means of one of the several optical channels of the second camera system, so that the at least one fourth individual image results/result, by itself/by themselves or together with a third individual image captured by the one of the several optical channels, in a fourth set of individual images which are captured with mutual time offset and which cover the panoramic visual field; and rendering a further panoramic image or a depth map for the panoramic image on the basis of the third set of third individual images and of the at least one fourth individual image.

10. The device as claimed in claim 9, further configured for estimating a parallax on the basis of the depth map; and compensating for the parallax on the basis of the estimated parallax.

11. The device as claimed in claim 9, further configured for selecting, for the at least one image area of the further panoramic image, one or more images from a subgroup comprised of the third individual images and of the at least one fourth individual image, said selection for the image area of the further panoramic image corresponding to the selection for the image area of the panoramic image from the subgroup comprised of the first individual images and of the at least one second individual image.

12. The device as claimed in claim 1, comprising a second camera system and being further configured for simultaneous capturing of a third set of third individual images which together cover the panoramic visual field, by means of several optical channels of the second camera system, the second camera system being arranged offset in relation to the first camera system; and compensating for parallax effects within the panoramic image while using the third set of third individual images.

13. The device as claimed in claim 1, further configured for capturing at least one further individual image by means of a further one of the several optical channels of the first camera system.

14. A method of generating a panoramic image of a panoramic visual field, comprising:

simultaneous capturing of a first set of first individual images which together cover the panoramic visual field, by means of several optical channels of a first camera system;

capturing at least one second individual image by means of one of the several optical channels of the first camera system, so that the at least one second individual image results, together or together with a first individual image captured by the one of the several optical channels, in a second set of individual images which are captured with mutual time offset and which cover the panoramic visual field;

selecting, for at least one image area of the panoramic image, one or more images among a subgroup which is comprised of the first individual images and of the at least one second individual image and which overlaps with the at least one image area;

rendering the panoramic image while using the one or more images within the at least one image area determining, within a first overlap area, a first difference between a first pair of first individual images which relate to at least one portion of the panoramic visual field and which overlap each other, within the panoramic visual field, within the first overlap area, determining, within a second overlap area, a second difference between a second pair of individual images from the second set of individual images which relate to the portion of the panoramic visual field and which overlap each other, within the panoramic visual field, within the second overlap area, selecting the first pair for rendering the panoramic image within the portion if the first difference is smaller than the second difference, and selecting the second pair for rendering the panoramic image within the portion if the first difference is larger than the second difference.

* * * * *